United States Patent [19]

Gray

[11] 4,076,611
[45] Feb. 28, 1978

[54] ELECTRODE WITH LANTHANUM-CONTAINING PEROVSKITE SURFACE

[75] Inventor: Thomas J. Gray, Halifax, Canada
[73] Assignee: Olin Corporation, New Haven, Conn.
[21] Appl. No.: 677,875
[22] Filed: Apr. 19, 1976
[51] Int. Cl.$^2$ .............. C25B 11/06; C25B 11/10; C25B 1/34
[52] U.S. Cl. .............. 204/290 F; 204/290 R; 204/291; 204/98
[58] Field of Search .............. 204/290 R, 290 F, 291; 252/521, 519

[56] References Cited

U.S. PATENT DOCUMENTS

| | | | |
|---|---|---|---|
| 3,544,378 | 12/1970 | Broyde | 204/291 X |
| 3,711,397 | 1/1973 | Martinsons | 204/290 F |
| 3,778,307 | 12/1973 | Beer | 427/126 |
| 3,846,273 | 11/1974 | Bianchi et al. | 204/290 F |
| 3,917,525 | 11/1975 | Bouy et al. | 204/290 F |
| 3,935,027 | 1/1976 | Warde et al. | 204/291 X |
| 3,974,108 | 8/1976 | Staut et al. | 252/521 |
| 3,993,653 | 11/1976 | Blum et al. | 204/272 |

OTHER PUBLICATIONS

Banks et al., J. of Applied Physics, vol. 41, No. 3, pp. 1186, 1187 (1970) 3-1-70.

*Primary Examiner*—F.C. Edmundson
*Attorney, Agent, or Firm*—Donald F. Clements; James B. Haglind; Thomas P. O'Day

[57] ABSTRACT

An electrode is described which is comprised of an electroconductive substrate having an exterior surface of perovskite of the emperical formula $$A A' B O_3 \qquad (I)$$

a. wherein A is lanthanum,
b. wherein A' is an alkaline earth metal selected from the group consisting of calcium, strontium, barium, and mixtures thereof,
c. wherein B is a transition metal selected from the group consisting of cobalt, chromium, tungsten, molybdenum, manganese, iron, nickel, rhenium, uranium, and mixtures thereof,
d. wherein the atomic ratio of A:A' is in the range from about 0.05:1 to about 0.95:1,
e. wherein the valence of A + A' + B = 6,
f. wherein said electrode has a resistivity preferably less than about 10 milliohm-centimeters$^{-1}$, and
g. wherein said perovskite is substantially insoluble in the electrolyte contacting said electrode under typical conditions of electrolysis.

11 Claims, No Drawings

ELECTRODE WITH LANTHANUM-CONTAINING PEROVSKITE SURFACE

This invention relates to a novel electrode having an exterior surface or perovskite.

Electrolytic cells have been used extensively to electrolyze brine to produce alkali metal chlorates or chlorine. In the conventional mercury cell, chlorine is produced at the anode and the resulting sodium-mercury amalgam is decomposed to form a relatively pure concentrated solution of caustic, which is collected, and denuded mercury which is recycled to the electrolytic cells. In electrolytic diaphragm cells, metallic cathodes are coated with a porous fibrous asbestos, and operated with metallic anodes positioned between each diaphragm-coated cathode.

Efforts have recently been made to utilize metal electrodes in cells of these types, since previously used carbon electrodes are consumed at a rapid rate during electrolysis.

One of the first successful metal electrodes used in these electrolytic cells was comprised of a valve metal substrate such as titanium, tantalum, zirconium, niobium, and the like with an exterior surface of a noble metal or noble metal oxide. Typical noble metals include platinum, ruthenium, iridium, palladium, and the like.

Subsequent developments defined the specific substrate and exterior surface metals and the relative proportions of each to improve stability and operating efficiency of the electrodes. However, because of the cost of the noble metal required to utilize these electrodes, a need was seen to obtain a less expensive, more stable metal electrode for use in electrolytic cells.

Considerable research has been directed to the development of perovskite based electrodes, wherein the perovskite has a general formula $$ABO_3,$$

wherein the total valence or ionic charge for A and B totals 6. Initial efforts in this area of research produced electrodes having a perovskite surface with a number of defects. One of the problems encountered was that certain perovskites were not electroconductive. Another problem was the instability of the perovskite exterior surface in the presence of the acidic aqueous brine electrolyte during conditions of electrolysis.

Another investigation studied the use of certain lanthanum-containing perovskites as catalysts and as electrodes to monitor oxygen partial pressure in solutions or biomedical applications. The structure of the perovskites required for use as electrodes in electrolytic cells which, for example, employ acidic brine electrolytes was not investigated.

Further investigation of perovskite electrodes showed that stability of the perovskite exterior could be improved by utilizing a mixture of certain metals as the A component of the above mentioned perovskite formula and by limiting the B component to cobalt. The A component was defined as a mixture of a rare earth metal having an atomic number below about 65, such as lanthanum, cerium, and the like, and a rare earth metal having an atomic number of at least about 65, such as terbium, dysprosym and the like. Although rare earth metals of this type may improve the stability of perovskite electrodes, the cost of preparing such perovskite electrodes is no improvement over previously known platinum metal-coated electrodes.

There is a need at the present time for a relatively low cost perovskite based electrode of improved stability.

It is primary object of this invention to provide an improved perovskite based electrode.

It is another object of this invention to provide a method of preparing perovskite based electrodes.

Still another object of the invention is to provide an improved method of operating electrolytic cells utilizing a perovskite based electrode. It is a further object of this invention to provide an improved perovskite composition useful in the preparation of electrodes which resist corrosion after extended contact with aqueous brine electrolyte under the conditions of electrolysis.

These and other objects of the invention will be apparent from the following detailed description thereof.

The foregoing objects are accomplished with an electrode comprised of an electroconductive substrate and a perovskite surface of the emperical formula:

$$A A' B O_3 \tag{I}$$

a. wherein A is lanthanum,
b. wherein A' is an alkaline earth metal selected from the group consisting of calcium, strontium, barium, and mixtures thereof,
c. wherein B is a transition metal selected from the group consisting of cobalt, chromium, tungsten, molybdenum, and mixtures thereof,
d. wherein the atomic ratio of A:A' is in the range from about 0.05:1 to about 0.95:1,
e. wherein the valence of A + A' + B = 6,
f. wherein said electrode has a resistivity preferably less than about 10 milliohmcentimeters$^{-1}$, and
g. wherein said perovskite is substantially insoluble in the electrolyte contacting said electrode under typical conditions of electrolysis.

These objects are also accomplished by the method of preparing the novel electrode and in its utilization as an electrode in electrolytic processes, such as the electrolysis of brine to produce chlorine and caustic or alkali metal chlorate.

More in detail, the A component of Formula I is lanthanum and the A' component of Formula I is an alkali metal consisting of strontium, calcium, barium and mixtures thereof. The atomic ratio of A to A' in Formula I defined by the Formula $$A_x A'_{(1-x)} \tag{II}$$

wherein $x$ is in the range from about 0.05 to about 0.95 and preferably from about 0.7 to about 0.9.

The preferred B component of Formula I is cobalt, but other suitable metals useful as the B component include ruthenium, chromium, tungsten, molybdenum, manganese, iron, nickel, rhenium, uranium, and mixtures thereof.

Several references which describe the structure and diffraction pattern of perovskites of Formula I are referred to in U.S. Pat. No. 3,917,525, which issued Nov. 4, 1975, to Buoy et al. Structures of Formula I useful in this invention have a ratio of (A + A') + B components as defined by the Goldschmidt expression for the perovskite structure tolerance, as follows:

$$R_a + R_b = (T/2)(R_b + R_o), \tag{III}$$

wherein:
1. $R_a$ and $R_b$ are radii or weighted average radii of A, A' and B, or other combinations thereof
2. $R_o$ is oxygen ion radius and
3. T is = 0.8 to 1.0.

In addition, the valence or ionic charge of the suitable perovskites are defined in the following formula:

$$A + A' + B = 6 \qquad (IV)$$

The term "perovskite" is applied to a broad class of compounds or composition generally (but only approximately) defined as $ABO_3$ and crystallographically cubic, pseudo-cubic or distorted cubic with or without a superlattice. The A ions are situated at the corners of the cubic unit cell with the B ions at the center and the oxygens at the centers of the faces. Each A ion is in a site of 12 -fold co-ordination and each B ion is in 6-fold co-ordination. Each oxygen is associated with four A cations and two B cations with the larger cation in the A site. The valencies are of only secondary importance and any pairs of ions of appropriate radii and an aggregate valency of 6 can appear. Furthermore, the perovskite structure can be regarded as a rigid framework of large oxygen anions interspersed with smaller cations in the interstices. In such a structure the actual distribution of the cations is statistical and electrical neutrality is preserved by lattice vacancies in anion or cation lattices. Additionally, the lattice tolerates two or more chemically different ions occupying crystallographically equivalent sites.

The primary requirements for a chlor-alkali electrolysis electrode are a resistivity at room temperature in the range substantially below one ohm $cm^{-1}$ and preferably below about 10 milliohm $cm^{-1}$, electrocatalytic activity resulting in low polarization in sodium chloride solution and chemical stability over the range of pH values normally experienced in electrolytic cells.

Perovskite compositions suitable for use as electrodes can be prepared in a variety of ways. Two general groups of preparative techniques can be employed. The first technique is based on methods of mechanical mixing and firing following classical ceramic procedures. The second technique is based on chemical procedures to yield a homogeneous final product or a calcinable precursor. Typical chemical processes are precipitation and spray drying. The second group of general methods of preparation is preferred, giving a more homogeneous, finely divided product more readily applicable to the fabrication of electrochemical electrodes.

Monolithic electrodes are best prepared by isostatic pressing at pressure 10,000 to 30,000 psi utilizing a rubber or similar conventional mold. Initial firing is performed at 1000°–1100° C., after which machining can be undertaken to the desired form with due allowance for shrinkage during subsequent firing to final density. Alternately, electrodes can be fabricated by the use of a portion of plastic monomer, such as polyester, epoxy, or millable plastic such as polyethylene, polyurethane, and the like in proportions of typically 10–20 percent by weight, then polymerizing or otherwise curing, then extruding or moulding into the appropriate form followed by firing to decompose the plastic and sinter the ceramic body.

In an alternative form the perovskite can be applied to a suitable metallic substrate such as titanium, or other valve metal substrate by electrophoretic deposition and subsequent heat treatment. Alternatively, colloidal silica or other similar material can be utilized to secure the perovskite to the electrode while maintaining adequate conductivity.

Electrodes prepared in accordance with the above procedure wherein the substrate is either one of the above identified perovskite formulation or a valve metal with an exterior surface of a perovskite composition of Formula I are useful in electrolytic cells, particularly of the diaphragm type wherein sodium chloride brine is electrolyzed to produce chlorine at the anode, and hydrogen, as well as an aqueous sodium hydroxide solution at the cathode. When the novel perovskite based electrodes of this invention are employed in electrolytic cells of this type, improved stability of the perovskite surface as well as improved resistivity characteristics are obtained.

The following examples are presented to define the invention more fully without any intention of being limited thereby.

EXAMPLE 1

Lanthanum oxide and cobalt oxide were admixed with strontium carbonate to form a dry mixture in which the gram atomic weight ratio of the cations was about 0.85 La — 0.15 Sr — 1.0 Co. The resulting dry mixture was placed in a furnace and fired to a temperature of approximately 850° C. Firing was continued until X-ray characterization established that the mixture had been completely converted to the perovskite form having the emperical formula $La_{0.85}Sr_{0.15}CoO_3$.

The perovskite composition was removed from the furnace, cooled to room temperature and placed in alcohol. The resulting alcohol slurry was then milled in a ball mill until substantially all of the particles were fine enough to pass a 325 mesh screen.

The resulting paste was then placed in a rubber mold having an interior diameter of approximately 1 inch, and then, by isotatic pressing, was compressed into a disc form. The disc was removed from the mold and placed into a furnace where it was fired initially at 1100° C., and then to a temperature of approximately 1800° C. to effect removal of the alcohol and bonding of the perovskite particles into a rigid disc having a thickness of approximately ⅛ inch.

This disc was then connected as an anode in an electrolytic cell containing a saturated sodium chloride solution at pH 2. The polarization characteristics of the anode were similar to a metal anode comprised of a titanium substrate coated with ruthenium oxide. In addition there was no detectable dissolution of the perovskite anode in the acidic electrode.

EXAMPLES 2-8

The procedure of Example 1 was repeated except by mixing lanthanum oxide, cobalt oxide, calcium oxide, barium oxide, strontium carbonate, manganese oxide and chromium oxide in proportions to form dry mixtures in which the gram atomic weight ratio of the cations were adjusted to form perovskites having the following emperical formulas:

| Example | Perovksite |
|---|---|
| 2 | $La_{0.8}Ca_{0.2}CoO_3$ |
| 3 | $La_{0.8}Ba_{0.2}CoO_3$ |
| 4 | $La_{0.8}Sr_{0.1}Ca_{0.1}CoO_3$ |
| 5 | $La_{0.8}Sr_{0.1}Ba_{0.1}CoO_3$ |
| 6 | $La_{0.8}Ca_{0.1}Ba_{0.1}CoO_3$ |
| 7 | $La_{0.85}Sr_{0.15}MnO_3$ |

| Example | Perovksite |
|---|---|
| 8 | $La_{0.85}Sr_{0.15}Cr_2O_3$ |

The polarization characteristics of the resulting perovskite anodes compared favorably with conventional metal anodes when tested in the electrolytic cell of Example 1. In addition, no detectable dissolution of the perovskite was noted in the acidic electrolyte, except for the anode of Example 8, which caused the electrolyte to have a yellow color.

EXAMPLE 9

Lanthanum oxide and cobalt oxide were admixed with strontium hydroxide hexahydrate to form a mixture in which the gram atomic weight ratio of the cations was about 0.8 La — 0.2 Sr — 1.0 CoO. The resulting mixture was placed in a suitable crucible and heated in a furnace to a temperature of about 850° C. Because of the hydrate content of the strontium hydroxide, the mixture first went through a liquid phase and then formed after firing as in Example 1, finely divided particles of a perovskite having the emperical formula $La_{0.8}Sr_{0.2}CoO_3$.

Because of the finely divided characteristic of the perovskite product, the ball milling operation of Example 1 was not necessary. The furnace product after cooling was molded with an uniaxial pressing in a mold of a hydraulic press to form a disc having a diameter of approximately 1 inch and a thickness of approximately $\frac{1}{8}$ inch. The resulting disc was removed from the mold and fired as in Example 1 and connected as an anode in the electrolytic cell of Example 1. Improved polarization characteristics over those obtained in Example 1 were achieved for this perovskite composition. In addition, no detectable dissolution of the perovskite anode occurred in the acidic electrolyte.

What is claimed is:

1. An electrode for the electrolysis of aqueous brine comprised of an electroconductive substrate and a perovskite surface of the emperical formula:

$$A\ A'\ B\ O_3 \tag{I}$$

a. wherein A is lanthanum,
b. wherein A' is an alkaline earth metal selected from the group consisting of calcium, strontium, barium, and mixtures thereof,
c. wherein B is a transition metal selected from the group consisting of cobalt, chromium, tungsten, molybdenum, manganese, iron, nickel, rhenium, uranium, and mixtures thereof,
d. wherein the atomic ratio of A:A' is in the range from about 0.05:1 to about 0.95:1, and
e. wherein the valence of A + A' B = 6.

2. The electrode of claim 1 wherein said B component is cobalt.

3. The electrode of claim 1 wherein said B component is chromium.

4. The electrode of claim 2 wherein the atomic ratio of said lanthanum to said alkaline earth metal is equivalent to the general formula $A_x A'_{(1-x)}$ wherein $x$ is from about 0.7 to about 0.9.

5. The electrode of claim 4 wherein said A' component is strontium.

6. The electrode of claim 4 wherein said A' component is calcium.

7. The electrode of claim 4 wherein said A' component is barium.

8. The electrode of claim 1 wherein said electroconductive substrate is a valve metal selected from the group consisting of titanium, tantalum, zirconium, niobium, and mixtures thereof.

9. The electrode of claim 9 wherein said valve metal is titanium.

10. In an electrolytic cell for the electrolysis of brine comprised of a cathode, an anode, a diaphragm covering said cathode, a container for electrolyte and means for collecting the electrolysis products, characterized by the improvement which comprises employing as said anode the electrode of claim 1.

11. The electrolytic cell of claim 10 wherein said electrode has a perovskite surface of Formula I wherein A' is strontium, B is cobalt, and the ratio of said lanthanum to said strontium is equivalent to the general formula $A_x A^1_{1-x}$, wherein $x$ is from about 0.7 to about 0.9.

* * * * *

UNITED STATES PATENT OFFICE
CERTIFICATE OF CORRECTION

Patent No. 4,076,611          Dated February 28, 1978

Inventor(s) Thomas J. Gray

It is certified that error appears in the above-identified patent and that said Letters Patent are hereby corrected as shown below:

In Claim 1, column 6, line 12, delete "A + A' B = 6." and insert --A + A' + B = 6.--.

In Claim 9, column 6, line 31, delete "9" and insert --8--.

*Signed and Sealed this*

*First* Day of *August 1978*

[SEAL]

Attest:

RUTH C. MASON
*Attesting Officer*

DONALD W. BANNER
*Commissioner of Patents and Trademarks*